United States Patent Office 3,660,384
Patented May 2, 1972

---

3,660,384
5-[2-(5-NITRO-2-FURYL)VINYL]PICOLINO-
HYDROXAMIC ACID
Roland N. Johnson, Norwich, N.Y., assignor to The
Norwich Pharmacal Company
No Drawing. Filed Mar. 16, 1970, Ser. No. 20,067
Int. Cl. C07d 99/04
U.S. Cl. 260—240 A
1 Claim

ABSTRACT OF THE DISCLOSURE

A new compound, 5-[2-(5-nitro-2-furyl)vinyl]picolino-hydroxamic acid, is an antibacterial useful in combating *Shigella flexneri* and *Escherichia coli* infection in animals upon peroral administration.

---

This invention relates to a chemical compound of the nitrofuran series. Particularly it is concerned with the new compound 5-[2-(5-nitro-2-furyl)vinyl]picolinohydroxamic acid and to a method for its preparation.

This compound in common with many nitrofurans possesses a high order of antibacterial activity against a wide spectrum of bacteria when assayed by the conventional in vitro serial dilution method as exempled here-below:

| Organism: | Inhibiting conc. in mcg./ml. |
|---|---|
| S. aureus | 0.190 |
| E. coli | 0.380 |
| S. faecalis | 0.190 |
| S. typhosa | 0.380 |
| A. aerogenes | 1.500 |
| Ps. aeruginosa | 12.500 |
| Shigella flexneri | 0.190 |
| Proteus mirabilis | 12.500 |
| H. vaginalis | 0.380 |

Its high order of antibacterial activity makes it adapted to be combined in dusts, solutions, unguents, suspensions, dispersions and the like for application to loci where the control of bacterial contamination is desired.

The compound of this invention is distinguished by its ability to combat infections in mice produced by *Shigella flexneri* or *Escherichia coli*. Thus, when administered by gavage in 0.5% sodium carboxymethyl cellulose suspension per os in a dose of about 200 mg./kg./day in three equally divided portions post infection to mice harboring infection induced by *S. flexneri* or *E. coli*, remarkable amelioration of the infection is evinced.

The in vivo capabilities of the compound of this invention are further evidenced in its appearance in the urine of animals to whom it is administered. A peroral dose of it of about 10 mg./kg. to rats results in the production of urine having antibacterial effect against common urinary tract pathogens such as *Escherichia coli* and *Aerobacter aerogenes*.

The compound of this invention is readily compounded into suitable dosage forms such as tablets, suspensions, solutions, capsules and the like using excipients and adjuvants known in the pharmaceutical art.

The method which is used in preparing the compound of this invention consists in bringing together methyl 5-[2-(5-nitro-2-furyl)-vinyl]picolinate and hydroxylamine in the presence of an inert solvent such as methanol or chloroform.

In order that this invention may be understood by and available to those skilled in the art the following synthesis is described:

A methanolic solution of hydroxylamine was prepared by adding a solution of 67.2 g. (1.20 moles) of potassium hydroxide in 160 ml. of methanol to a warm solution of 83.2 g. (1.20 moles) of hydroxylamine hydrochloride in 480 ml. of methanol. The mixture was cooled and the potassium chloride removed by filtration. The filtrate was added to a solution of 82.4 g. (0.300 mole) of methyl 5-[2-(5-nitro-2-furyl)vinyl]picolinate in 1200 ml. of chloroform. The mixture was allowed to stand for 15 min., then filtered to remove inorganic material. After 3 days at room temperature, the crude product was collected by filtration. Yield: 33 g. (40%); decomposition point ca. 220°.

What is claimed is:
1. The compound 5-[2-(5-nitro-2-furyl)vinyl]picolino-hydroxamic acid of the formula:

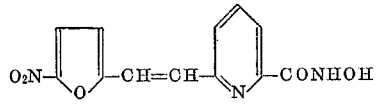

References Cited

UNITED STATES PATENTS
3,532,691  10/1970  Haack et al. _____ 260—240

OTHER REFERENCES
Shirley, "Organic Chemistry," Holt, Rinehart and Winston, New York N.Y. (1964), p. 391.

HENRY R. JILES, Primary Examiner

G. T. TODD, Assistant Examiner

U.S. Cl. X.R.
424—263